United States Patent [19]

Assinder

[11] Patent Number: 5,355,255
[45] Date of Patent: Oct. 11, 1994

[54] EXTERIOR REAR VIEW MIRROR FOR A MOTOR VEHICLE

[75] Inventor: Andrew J. Assinder, Bognor Regis, England

[73] Assignee: Britax Wingard Limited, Hampshire, England

[21] Appl. No.: 44,269

[22] Filed: Apr. 7, 1993

[30] Foreign Application Priority Data

Apr. 23, 1992 [GB] United Kingdom ............... 9208831

[51] Int. Cl.⁵ .......................... G02B 7/182; B60R 1/02
[52] U.S. Cl. .................................... 359/871; 248/481
[58] Field of Search ............... 359/871; 248/481, 488, 248/490, 221.4, 224.3

[56] References Cited

U.S. PATENT DOCUMENTS

| 3,802,766 | 4/1974 | Magi | 359/871 |
|---|---|---|---|
| 4,488,778 | 12/1984 | Polzer et al. | 359/871 |
| 4,998,814 | 3/1991 | Perry | 359/871 |

FOREIGN PATENT DOCUMENTS

| 2907433 | 4/1981 | Fed. Rep. of Germany | B60R 1/06 |
|---|---|---|---|
| 3125701A1 | 3/1983 | Fed. Rep. of Germany | B60R 1/06 |
| 3206755 | 9/1983 | Fed. Rep. of Germany | 359/871 |
| 3206755A1 | 9/1983 | Fed. Rep. of Germany | B60R 1/06 |
| 4133330 | 1/1993 | Fed. Rep. of Germany | 359/871 |
| 2504075 | 10/1982 | France | B60R 1/06 |
| 1224523 | 3/1971 | United Kingdom | B60R 1/02 |
| 1283160 | 7/1972 | United Kingdom | B60R 1/02 |
| 1453470 | 10/1976 | United Kingdom | B60R 1/02 |
| 2217665 | 11/1989 | United Kingdom | B60R 1/06 |

*Primary Examiner*—Loha Ben
*Assistant Examiner*—John Juba, Jr.
*Attorney, Agent, or Firm*—Harness, Dickey & Pierce

[57] ABSTRACT

An exterior rear view mirror assembly for a motor vehicle, comprises a first mounting plate pivotally mounted within a housing and a mirror glass secured to a second mounting plate. The first mounting plate has a pair of spaced parallel projections, each of which contains a groove confronting the groove 38) in the other projection. A pair of resilient beams are secured at their ends to the second mounting plate by spaced-apart support formations so as to engage in the grooves in the projections on the first mounting plate. One of the grooves contains protuberances positioned to engage with the beam at an intermediate location between its ends. The second mounting plate can be released from the first mounting plate by bending the beam round the protuberances so as to allow the other beam to disengage from the projections.

8 Claims, 2 Drawing Sheets

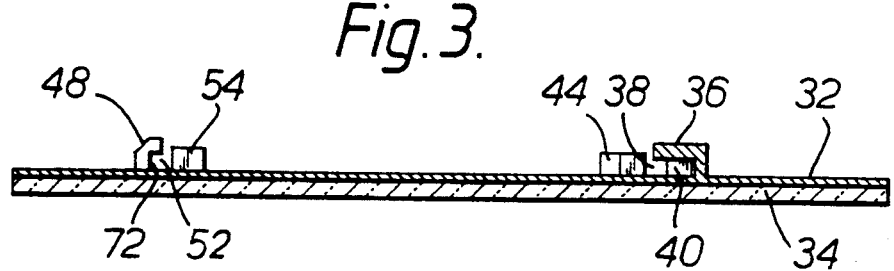
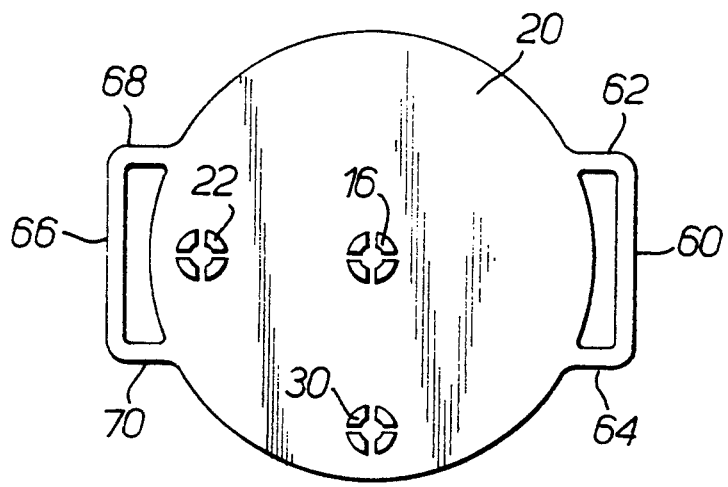
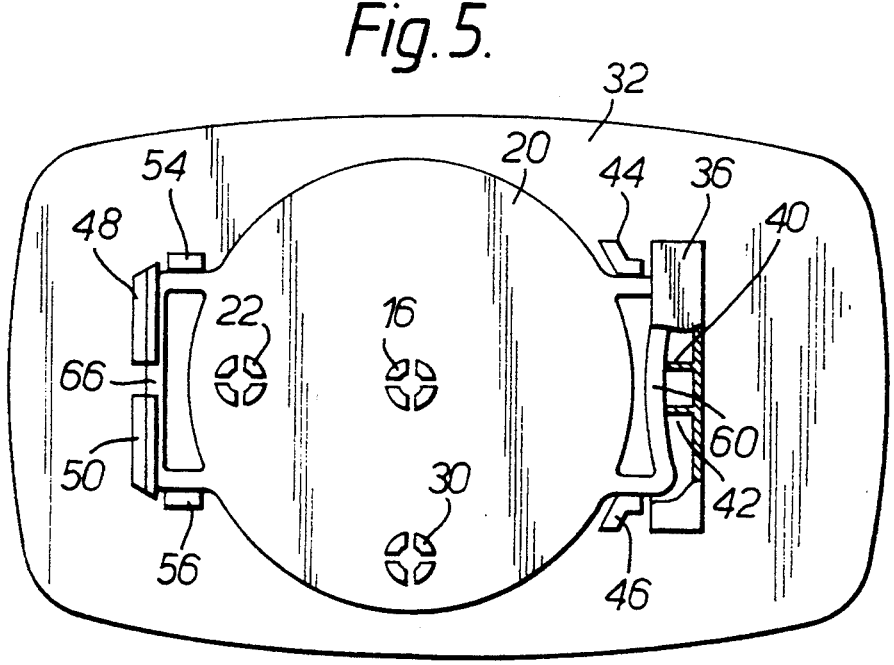

EXTERIOR REAR VIEW MIRROR FOR A MOTOR VEHICLE

FIELD

This invention relates to an exterior rear view mirror assembly for a motor vehicle of the type comprising a housing adapted to be secured to the exterior of a motor vehicle body, a first mounting plate pivotally mounted within the housing, a mirror glass secured to a second mounting plate and a detachable catch assembly, releasable from outside the housing, for securing the second mounting plate to the first mounting plate.

RELATED ART

A rear view mirror assembly of this type is disclosed in DE-C-2907433. A hole is provided in the bottom of the housing in order to provide access for a tool to permit disengagement of the catch assembly.

GB-A-2217665 discloses a rear view mirror assembly having two mounting plates interconnected by a catch assembly comprising by snap-locking hooks which cannot be released from outside the housing.

SUMMARY OF THE INVENTION

According to the invention, in a mirror assembly of the type described above the catch assembly comprises a pair of spaced parallel projections on one of said mounting plates, each projection containing a groove confronting the groove in the other projection, and a pair of outwardly directed abutment formations on the other of said mounting plates resiliently biassed apart from each other and spaced apart so that each abutment formation is engageable in a respective one of said grooves.

In one form of the invention, one of the abutment formations comprises a resilient beam mounted on spacedapart support formations and the corresponding groove contains a protuberance positioned to engage with the beam at an intermediate location between the support formations.

Preferably, the other abutment formation also comprises a resilient beam mounted on spaced-apart support formations and the second groove includes an abutment surface arranged to engage with the second beam at locations adjacent to its support formations. With this arrangement, the two abutment formations can be constructed so as to be substantially identical so that either abutment formation can engage in either groove.

In a preferred embodiment of the invention, the projections containing the abutment formations are fast with the first mounting plate and the mutually confronting grooves are fast with the second mounting plate.

BRIEF DESCRIPTION OF THE DRAWINGS

FIG. 3 is a cross-sectional view taken on the line 3—3 in FIG. 2;

FIG. 4 is an elevational view of the first mounting plate of the mirror assembly shown in FIG. 1, taken from the opposite side to that which abuts against the second mounting plate; and FIG. 5 shows the components illustrated in FIGS. 2 and 4 assembled together.

DETAILED DESCRIPTION OF THE PREFERRED EMBODIMENT

Figure 1:
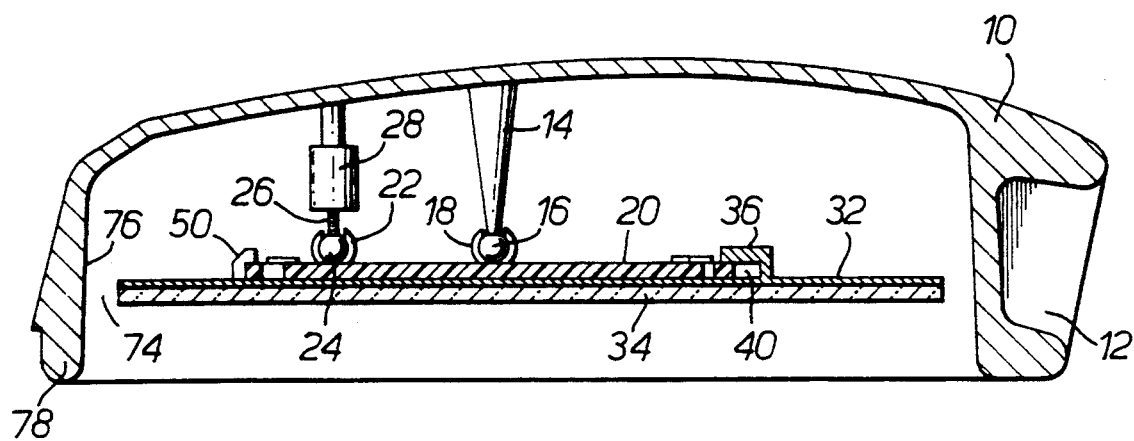
FIG. 1 is a horizontal cross-sectional view of a vehicle rear view mirror assembly in accordance with the invention.

Referring to FIG. 1, an exterior rear view mirror assembly has a housing 10 with an end 12 adapted for connection to means (not shown) for mounting the mirror assembly on a motor vehicle body. A support pillar 14 projects from the interior of the housing and has a spherical formation 16 on its outer end which is engaged by a socket formation 18 on a first mounting plate 20. The first mounting plate 20 also has a second socket formation 22 which engages with a spherical formation 24 on the end of a jacking screw 26 of a screw jack drive unit 28 which may, for example, be as described in U.S. Pat. No. Re. 34,142, which includes an electric motor and which enables the second mounting plate 20 to be pivoted relative to the housing 10 about an axis through the spherical formation 16 perpendicular to the plane of the drawing. A similar screw jack drive unit (not shown) has its jacking screw engaging with a further spherical socket 30 (see FIG. 4) to permit adjustment about an axis through the spherical formation 16 orthogonal to the first mentioned axis.

On its outwardly facing side, the first mounting plate 20 abuts against a second mounting plate 32 which has a mirror glass 34 secured to its front surface by adhesive. The second mounting plate 32 is secured to the first mounting plate 20 by catch means in accordance with the invention as will now be described.

Figure 2:
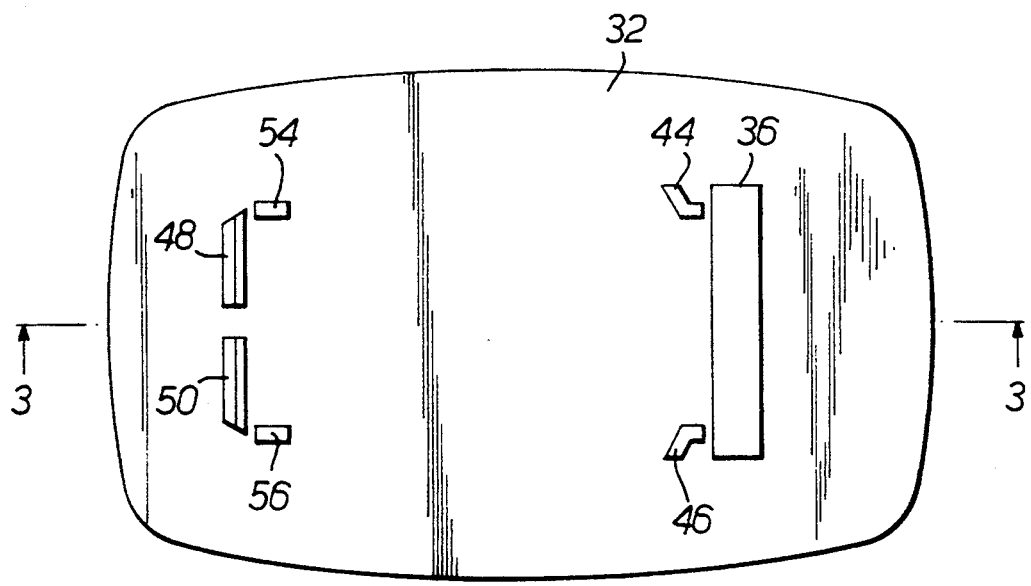
FIG. 2 is an elevational view of the second mounting plate of the mirror assembly shown in FIG. 1 from the side opposite to that on which the mirror glass is mounted.

Referring to FIGS. 2 and 3, the side of the second mounting plate 32 facing the first mounting plate 20 carries a first elongate L-shaped projection 36 which, with the adjacent surface of the second mounting plate 32, forms a groove 38 facing towards the centre of the second mounting plate 32. Near the centre of the projection 36, two ribs 40 and 42 (see also FIG. 5) project across the groove 38 for approximately two-thirds of its depth. Adjacent to each end of the projection 36 are respective guide projections 44 and 46.

Opposite the projection 36, the second mounting plate 32 carries a pair of L-shaped projections 48 and 50 each of which bounds part of a groove 52 facing the groove 38. The depth of the groove 52 is about one-third of the depth of the groove 38. Guide projections 52 and 54 are disposed adjacent to the outer ends of the projections 48 and 50.

Referring to FIG. 4, the first mounting plate 20 has an integrally moulded beam 60, supported at its ends on mountings 62 and 64 which project from the periphery of the first mounting plate 20. A second beam 66 is supported on mountings 68 and 70 which project from the opposite side of the first mounting plate 20. The first mounting plate 20 is moulded from a plastics material which is sufficiently resilient to allow the beams 60 and 62 to bend towards the adjacent periphery of the first mounting plate 20 if an inwardly directed thrust is applied.

When the second mounting plate 32 is to be mounted on the first mounting plate 20, the first beam 60 is inserted into the groove 38 so that it abuts against the ribs 40 and 42 as shown in FIG. 5. The second mounting plate 20 is then displaced to the left as viewed in FIGS. 1 and 5 so as to bend the first beam 60 sufficiently to allow the second beam 66 to pass over the edge of the projections 48 and 50 and into the groove 52. When the second beam 66 abuts against surfaces 72 of the projections 48 and the inner end of the groove 52, the first beam 60 is still somewhat bowed, as illustrated in FIG. 5. The guide projections 44, 46, 54 and 56 limit sliding movement of the beams 60 and 66 along the grooves 38 and 52 with the result that the second mounting plate 32, and with it the mirror glass 34, are securely located with respect to the first mounting plate 20.

If it is desired to remove the mirror glass 34 from the housing 10, a lever (not shown) may be inserted into the gap 74 between the mirror glass 34 and the inner wall 76 of the outer part of the housing 10. If the lever is pivoted about the outer edge 78 of the wall 74, the mirror glass 34 and the second mounting plate 32 are first displaced to the right, as viewed in FIG. 1, further bending the first beam 60 until the second beam 66 is clear of the groove 52 whereupon the pivoting movement of the aforesaid lever displaces the second mounting plate 32 outwardly until it is clear of the front of the housing 10. The mirror glass 34 and second mounting plate 32 can then be grasped by hand and removed.

Since the beams 60 and 66 are identical, the second mounting plate 32 can alternatively be inserted into the housing 10 so that the second beam 66 engages in the groove 38 and the first beam 60 in the groove 52.

The invention can be applied to any type of mirror assembly where the mirror glass is secured to a mounting plate in a housing which has sufficient clearance to allow for limited lateral displacement of the mirror glass therein. In particular, it is applicable to mirror assemblies in which the orientation of the mirror glass relative to the housing can be adjusted using mechanical means, for example, Bowden cables, as well as by electrical means as described above.

I claim:

1. An exterior rear view mirror assembly for a motor vehicle, comprising a housing adapted to be secured to the exterior of a motor vehicle body, a first mounting plate pivotally mounted within the housing, a mirror glass secured to a second mounting plate and a detachable catch assembly, releasable from outside the housing, for securing the second mounting plate to the first mounting plate, wherein the catch assembly comprises a pair of spaced parallel projections on one of said mounting plates, each projection containing a groove confronting the groove in the other projection, and a pair of outwardly directed abutment formations on the other of said mounting plates resiliently biassed apart from each other and spaced apart so that each abutment formation is engageable in a respective one of said grooves.

2. A rear view mirror assembly according to claim 1, wherein one of the abutment formations comprises a resilient beam mounted on spaced-apart support formations and the corresponding groove contains a protuberance positioned to engage with the beam at an intermediate location between the support formations.

3. A rear view mirror assembly according to claim 2, wherein the other abutment formation also comprises a resilient beam mounted on spaced-apart support formations and the second groove includes an abutment surface arranged to engage with the second beam at locations adjacent to its support formations.

4. A rear view mirror assembly according to claim 3, wherein the resilient beams are substantially identical with each other.

5. A rear view mirror assembly according to claim 4, wherein the outwardly directed abutment formations are fast with the first mounting plate and the mutually confronting grooves are fast with the second mounting plate.

6. A rear view mirror assembly according to claim 2, wherein the outwardly directed abutment formations are fast with the first mounting plate and the mutually confronting grooves are fast with the second mounting plate.

7. A rear view mirror assembly according to claim 1, wherein the outwardly directed abutment formations are fast with the first mounting plate and the mutually confronting grooves are fast with the second mounting plate.

8. A rear view mirror assembly according to claim 3, wherein the outwardly directed abutment formations are fast with the first mounting plate and the mutually confronting grooves are fast with the second mounting plate.

* * * * *